April 15, 1930.  C. J. ELLIS  1,754,505
RAILWAY TRUCK
Filed Feb. 14, 1929  3 Sheets-Sheet 1

INVENTOR.
CHARLES J. ELLIS
BY Toulmin & Toulmin
ATTORNEYS.

April 15, 1930.  C. J. ELLIS  1,754,505
RAILWAY TRUCK
Filed Feb. 14, 1929  3 Sheets-Sheet 2
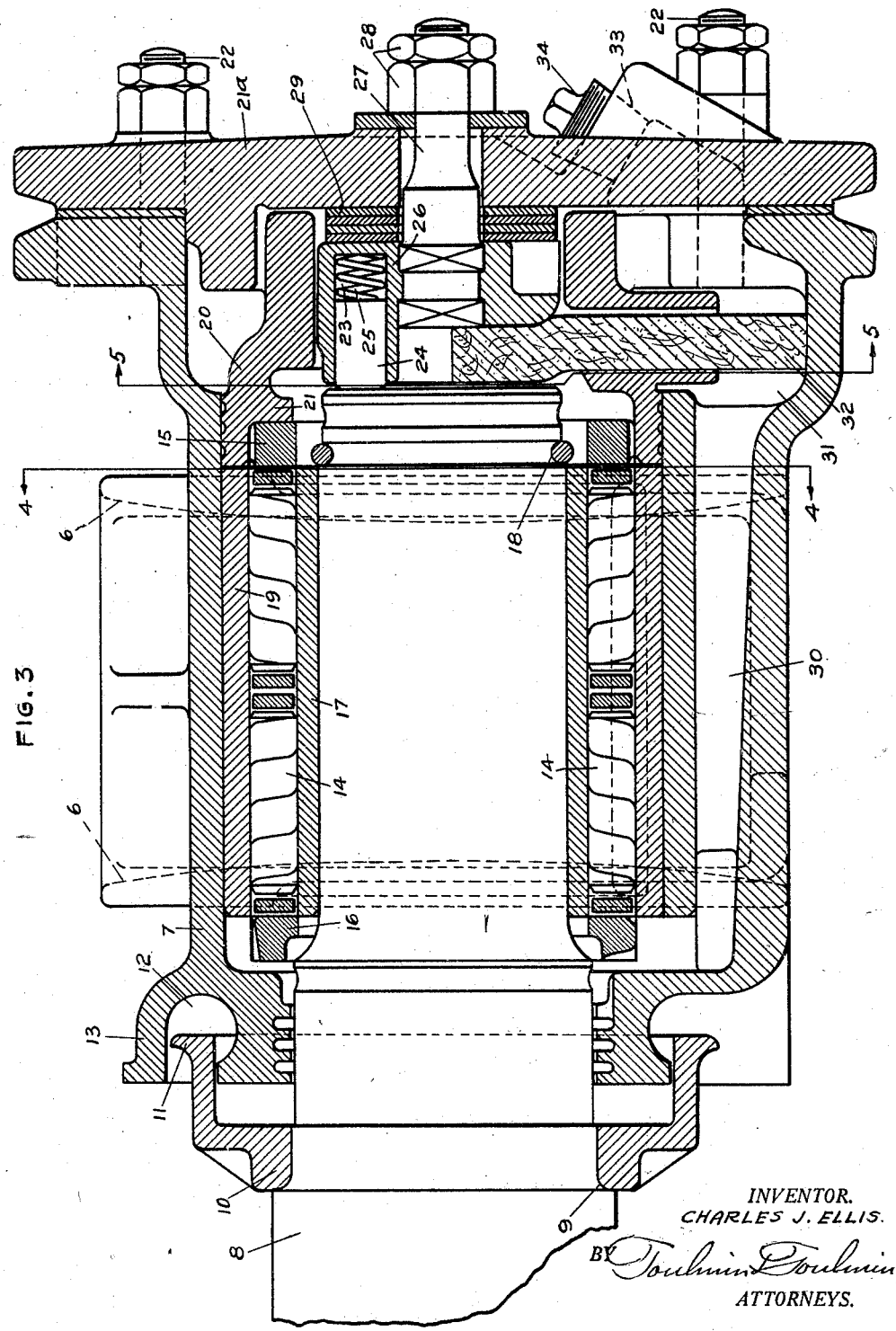
INVENTOR.
CHARLES J. ELLIS.
BY Toulmin Toulmin,
ATTORNEYS.

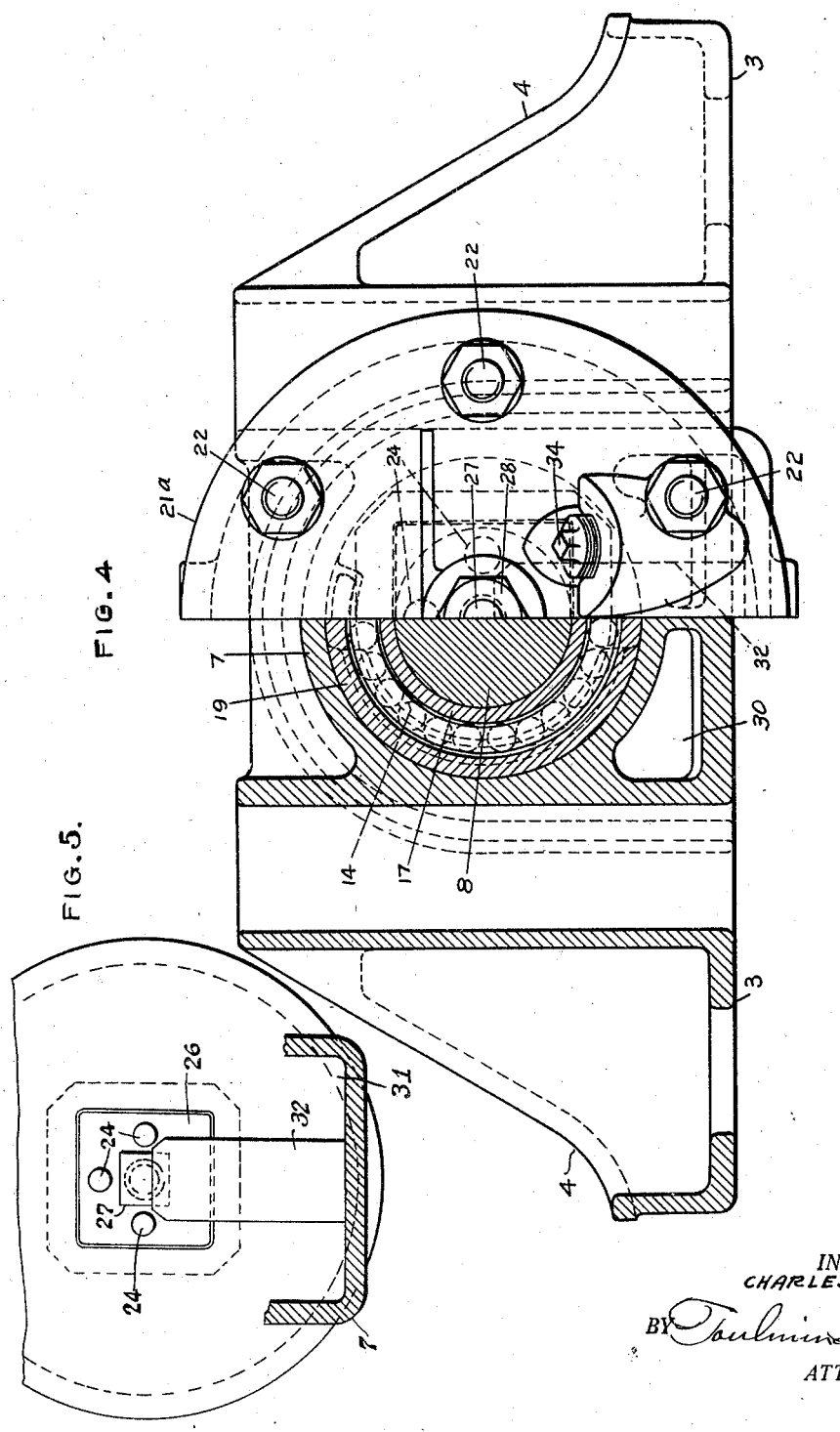

Patented Apr. 15, 1930

1,754,505

UNITED STATES PATENT OFFICE

CHARLES J. ELLIS, OF CINCINNATI, OHIO, ASSIGNOR, BY MESNE ASSIGNMENTS, TO THE CINCINNATI CAR CORPORATION, OF CINCINNATI, OHIO, A CORPORATION OF OHIO

RAILWAY TRUCK

Application filed February 14, 1929. Serial No. 339,815.

My invention relates to railway trucks.

It is the object of my invention to provide a railway truck so arranged as to carry the current on the return line around the bearings to the axle and thence to the wheels and roller without the current being caused to pass directly through the bearings to thus save the pitting and injury to the bearings.

Heretofore, the barrier to the use of roller bearings and ball bearings in trucks of electric vehicles, which could be used on steam railways or other equipment not using electricity, has been that when electricity is used the bearings have become pitted and injured by reason of the passage of electric current.

Referring to the drawings:

Figure 3 is a section on the line 3—3 of Figure 1;

Figure 4 is a section on the line 4—4 of Figure 3;

Figure 5 is a section on the line 5—5 of Figure 3.

Figure 1:
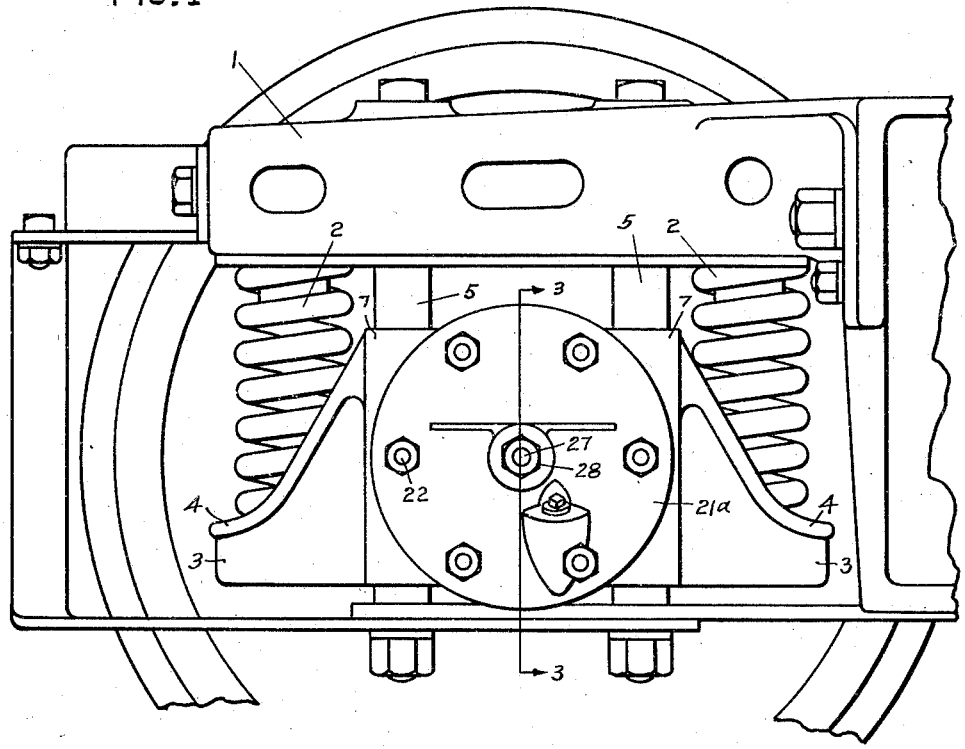
Figure 1 is an end elevation of the bearing installed in one end of the car truck.
Figure 2:
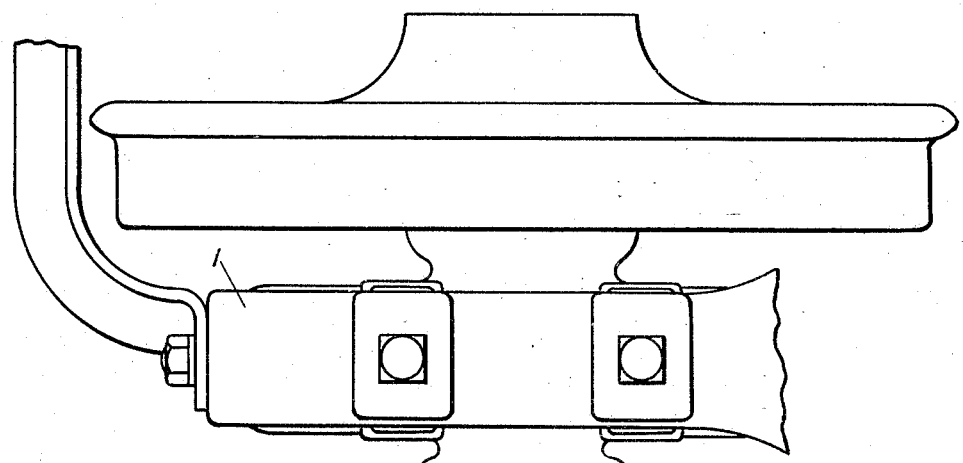
Figure 2 is a plan view thereof.

Referring to the drawings in detail, 1 designates the truck frame mounted upon the vehicle springs 2 which in turn are mounted upon the wings 3 of the casing 4, which carries the bearing. The bearing is held in alignment by the vertical members 5 as to which it is adapted to rock laterally by reason of the internally tapered construction of the walls 6 in which the vertical standards are located, such walls forming the passageways through the bearing casing generally designated 7.

8 designates the axle having a shoulder 9 on which is mounted a hub flange 10 projecting at 11 internally of a groove 12 in the casing end flange 13 of the casing 7.

The axle is mounted in roller bearings 14 in the usual manner. The bearings are retained in position by the retainer ring 15, at one end of the bearing, and a bearing retainer ring 16 at the other end thereof. 17 designates a bearing sleeve mounted on the axle retained in position by the split ring 18, while 19 designates the outer bearing ring retained in position by the retainer ring 20 whose shoulder 21 retains the ring 15 in position. The retaining bearing ring 16 engages with the wall of the casing. The end of the casing is closed by an end plate 21ª which is retained in position in the casing by the bolts 22. This end plate 21ª is provided with an apertured plate having the apertures opening inwardly designated 23 which are adapted to contain carbon brushes 24 spring pressed outwardly by the helical springs 25 so that the ends of the brushes engage with the end of the axle.

This apertured plate is designated 26 and is supported in position by the bolt 27 which is bolted by the nuts 28 on the outside of the plate 21ª. Shims 29 are interposed between this apertured plate 26 and the end plate 21ª to regulate the distance between the inside end of the plate 26 and the end of the axle. The casing in which the axle and bearing are located is provided with a reservoir passageway 30 communicating with a well 31 in which is located an oiling wick 32. This well is fed with oil through the port 33 closed by the screw plug 34.

The current will pass through the vehicle frame into the truck frame, thence through the bearing casing through the carbon brushes and into the axle without passing through the bearings, thus eliminating the pitting of the bearings. The current then passes on to the wheels and the rails.

It will be understood that I desire to comprehend within my invention such modifications as may be necessary to adapt it to varying conditions and uses.

Having thus fully described my invention, what I claim as new and desire to secure by Letters Patent, is:

1. In combination, a truck, an axle and wheels, bearings therefor, and means including a plurality of carbon brushes to conduct current through the truck and to the axle thence to the wheels without going through the bearings, said brushes being inclosed in an apertured plate.

2. In combination in a vehicle of a truck, an axle and wheels, a bearing casing, bearings interposed between the casing and the axle and a plurality of electrical conducting contact members engaging the axle carried in an apertured plate supported by the bearing casing whereby electrical current will pass through the truck casing and to the axle without passing through the bearings.

3. In combination in a vehicle of a truck having a bearing casing, bearings therein, an axle and wheels supported thereby and a plurality of electrical conducting means yieldingly engaging said axle carried in an apertured plate supported by said bearing casing for the conducting of electricity to the casing through the axle without going through the bearings.

4. In combination in a vehicle of a truck having a bearing casing, bearings therein, an axle and wheels supported thereby and electrical conducting means yieldingly engaging said axle carried in an apertured plate supported by said bearing casing for the conducting of electricity to the casing through the axle without going through the bearings, said electrical means consisting of carbon brushes engaging the ends of the axle.

5. In combination, a bearing casing, bearings therein, an axle supported thereby adapted to move laterally therein and a plurality of brushes carried by said casing adapted to yieldingly engage the end of said axle.

6. In combination, a bearing casing, bearings therein, an axle supported thereby adapted to move laterally therein and a plurality of brushes carried by said casing adapted to yieldingly engage the end of said axle, a reservoir for lubricant in said casing and a wick adapted to convey the oil therefrom to lubricate the end of the axle.

7. In combination in a vehicle of a bearing casing, a bearing therein, an axle supported thereby, a brush plate supported by said casing adjacent the end of the axle having an aperture, a brush mounted therein and means to cause said brush to yieldingly engage the end of said axle.

8. In combination in a vehicle of a bearing casing, a bearing therein, an axle supported thereby, a brush plate supported by said casing adjacent the end of the axle having an aperture, a brush mounted therein and means to cause said brush to yieldingly engage the end of said axle, and means to adjust the relative position between said bearing casing and said brush supporting plate.

9. In combination in a vehicle of a casing, axle bearings interposed therebetween, means in said casing for retaining said bearings in position, an end plate adapted to close said casing, a brush plate supported within said end plate, means to space said brush plate from said end plate, a plurality of brushes yieldingly mounted within said brush plate adapted to engage the end of the axle.

10. In combination in a vehicle of a casing, axle bearings interposed therebetween, means in said casing for retaining said bearings in position, an end plate adapted to close said casing, a brush plate supported within said end plate, means to space said brush plate from said end plate, a plurality of brushes yieldingly mounted within said brush plate adapted to engage the end of the axle, an oil reservoir in the bottom of said casing and a spacer sleeve between said bearing and said end plate having means for supporting a wick in said oil reservoir extending to a point between the end of the axle and said brush plate.

11. In combination, an axle, a roller bearing mounted thereon having inner and outer bearing sleeves, means on said axle to retain the inner bearing sleeve in position, retainer rings for said bearings, means to retain one of said retainer rings and the outer bearing sleeve in positon, an end plate engaging therewith mounted on said casing, an internally disposed brush plate supported on said end plate between the end of the axle and the end plate, a plurality of brushes yieldingly mounted in said brush plate engaging the end of the axle, shims between said brush plate and said end plate, said means for mounting said brush plate on said end plate projecting through said brush plate.

12. In combination, an axle, a roller bearing mounted thereon having inner and outer bearing sleeves, means on said axle to retain the inner bearing sleeve in position, retainer rings for said bearings, means to retain one of said retainer rings and the outer bearing sleeve in position, an end plate engaging therewith mounted on said casing, an internally disposed brush plate supported on said end plate between the end of the axle and the end plate, a plurality of brushes yieldingly mounted in said brush plate engaging the end of the axle, shims between said brush plate and said end plate, said means for mounting said brush plate on said end plate projecting through said brush plate, and means for supporting in position between the end of the axle and the brush plate an oil wick consisting of a support formed in the retaining sleeve for the outer bearing sleeve and bearing retainer rings, said casing being formed with a reservoir into which said wick is inserted for lubricant distribution.

In testimony whereof I affix my signature.

CHARLES J. ELLIS.